(12) United States Patent
Ueda

(10) Patent No.: US 9,049,374 B2
(45) Date of Patent: Jun. 2, 2015

(54) IMAGING APPARATUS WITH CAMERA SHAKE CORRECTION FUNCTION

(71) Applicant: Panasonic Corporation, Osaka (JP)

(72) Inventor: Yuji Ueda, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 116 days.

(21) Appl. No.: 13/686,112

(22) Filed: Nov. 27, 2012

(65) Prior Publication Data

US 2013/0135487 A1 May 30, 2013

(30) Foreign Application Priority Data

Nov. 28, 2011 (JP) .................................. 2011-258968

(51) Int. Cl.
*H04N 5/232* (2006.01)

(52) U.S. Cl.
CPC ....... *H04N 5/23251* (2013.01); *H04N 5/23258* (2013.01); *H04N 5/23267* (2013.01)

(58) Field of Classification Search
CPC ............ H04N 5/2348; H04N 5/23287; H04N 5/23258; H04N 5/23267
USPC ...................................................... 348/208.4
See application file for complete search history.

(56) References Cited

U.S. PATENT DOCUMENTS

| | | | |
|---|---|---|---|
| 5,822,623 A * | 10/1998 | Urata et al. | 396/52 |
| 7,564,482 B2 | 7/2009 | Clarke et al. | |
| 2006/0104620 A1 * | 5/2006 | Ebato | 396/55 |
| 2006/0170784 A1 | 8/2006 | Clarke et al. | |
| 2007/0166021 A1 * | 7/2007 | Yamazaki | 396/55 |
| 2009/0284609 A1 * | 11/2009 | Matsunaga | 348/208.12 |
| 2010/0214423 A1 * | 8/2010 | Ogawa | 348/208.4 |
| 2010/0245604 A1 * | 9/2010 | Ohmiya et al. | 348/208.99 |
| 2010/0328470 A1 * | 12/2010 | Yumiki | 348/207.2 |
| 2011/0134528 A1 * | 6/2011 | Suzuka | 359/554 |
| 2012/0092511 A1 * | 4/2012 | Wakamatsu | 348/208.2 |
| 2012/0093493 A1 * | 4/2012 | Wakamatsu | 396/55 |
| 2012/0293672 A1 * | 11/2012 | Nonaka et al. | 348/208.5 |
| 2014/0204226 A1 * | 7/2014 | Murakami et al. | 348/208.1 |

FOREIGN PATENT DOCUMENTS

| | | |
|---|---|---|
| JP | 2002-94877 | 3/2002 |
| JP | 2006-129391 | 5/2006 |
| JP | 2006-184679 | 7/2006 |
| JP | 2010-204341 | 9/2010 |
| JP | 2012-010063 | 1/2012 |

* cited by examiner

*Primary Examiner* — Roberto Velez
*Assistant Examiner* — Cynthia Segura
(74) *Attorney, Agent, or Firm* — Panasonic Patent Center

(57) ABSTRACT

An imaging apparatus includes an image sensor that exposes a subject image by reading lines sequentially to generate an image; a detector that detects an angular velocity of a shake of the imaging apparatus; a controller that: (i) determines the detected angular velocity as an angular velocity for correction when the detected angular velocity is equal to or less than a predetermined angular velocity and, determines the predetermined angular velocity as the angular velocity for correction when the detected angular velocity is larger than the predetermined angular velocity; and (ii) corrects to reduce an influence of a shake to the image generated by the image sensor by image processing based on the determined angular velocity for correction.

10 Claims, 6 Drawing Sheets

A: REGION IN WHICH DISTORTION OF A SUBJECT IN THE IMAGE IS NOT OUTSTANDING
B: REGION IN WHICH DISTORTION OF A SUBJECT IN THE IMAGE IS OUTSTANDING
C: REGION IN WHICH GYRO SENSOR CANNOT DETECT ANGULAR VELOCITY

IMAGING APPARATUS WITH CAMERA SHAKE CORRECTION FUNCTION

BACKGROUND

1. Technical Field

This disclosure relates to an imaging apparatus having a camera shake correction function.

2. Related Art

JP-A-2002-94877 discloses an electronic camera. The electronic camera records image data representing an image obtained by partially cutting out a captured image into a recording medium. The electronic camera performs correction to rotate a cutting-out position (cutting-out range) of the captured image in a direction to cancel out the rotation of the captured image by a camera shake. In this manner, the electronic camera can record image data with a reduced influence of a camera shake in a roll direction, into a recording medium.

SUMMARY

When a correction technique described in JP-A-2002-94877 is applied to an imaging apparatus using an imaging sensor using a manner of reading lines sequentially such as a CMOS sensor, an image for which a camera shake is corrected may be viewed by a user with uncomfortable feelings.

The disclosure provides an imaging apparatus that can suppress a user who views an image for which a camera shake is corrected from having uncomfortable feelings even though an imaging sensor using a manner of reading lines sequentially is used.

An imaging apparatus according to the present disclosure includes an image sensor that exposes a subject image by reading lines sequentially to generate an image; a detector that detects an angular velocity of a shake of the imaging apparatus; a controller that: (i) determines the detected angular velocity as an angular velocity for correction when the detected angular velocity is equal to or less than a predetermined angular velocity and, determines the predetermined angular velocity as the angular velocity for correction when the detected angular velocity is larger than the predetermined angular velocity; and (ii) corrects to reduce an influence of a shake to the image generated by the image sensor by image processing based on the determined angular velocity for correction.

The disclosure can provide an imaging apparatus that can show a proper corrected image to a user even though an imaging sensor using a manner of reading lines sequentially is used.

DETAILED DESCRIPTION OF PREFERRED EMBODIMENT

Embodiments will be described below detail appropriately with reference to the accompanying drawings. However, an excessively detailed description may be omitted. For example, detailed descriptions of already well-known items and redundant descriptions for substantially the same configurations may be omitted. This is to avoid the following descriptions from being unnecessarily redundant and to facilitate understanding by persons skilled in the art.

The present inventor provides the accompanying drawings and the following descriptions to cause persons skilled in the art to sufficiently understand the disclosure and does not intend to limit the subject matter described in the scope of claims by the drawings and the descriptions.

A description will now be given of a reason why a user who views an image for which a camera shake is corrected has uncomfortable feelings when the correction technique described in JP-A-2002-94877 is applied to the imaging apparatus using the imaging sensor using a manner of reading lines sequentially.

In the imaging sensor using a manner of reading lines sequentially, for example, lines are sequentially read in descending order. For this reason, read timings of the lines have time differences. For example, when the lines are sequentially read in descending order as described above, a lower line is read at a later timing.

When a moving subject is captured by using an imaging apparatus having an imaging sensor, an image of the captured subject is distorted. Even though a subject does not move, when the imaging apparatus moves due to a camera shake or the like with respect to the subject, an image of the captured subject is distorted as in the case of capturing a moving subject.

When the image captured with distortion due to a camera shake is made completely still by the camera shake correction technique described in JP-A-2002-94877, distortion of the subject in the captured image is easily visually recognized by a user and the user who views an image for which a camera shake is corrected may have uncomfortable feelings.

For this reason, the embodiment provides an imaging apparatus that can suppress a user who views an image for which a camera shake is corrected from having uncomfortable feelings even though an imaging sensor using a manner of reading lines sequentially is used.

The imaging apparatus of the disclosure will be described below in detail.

1. First Embodiment

A first embodiment will be described with reference to the drawings.

1-1. Outline

Figure 1:
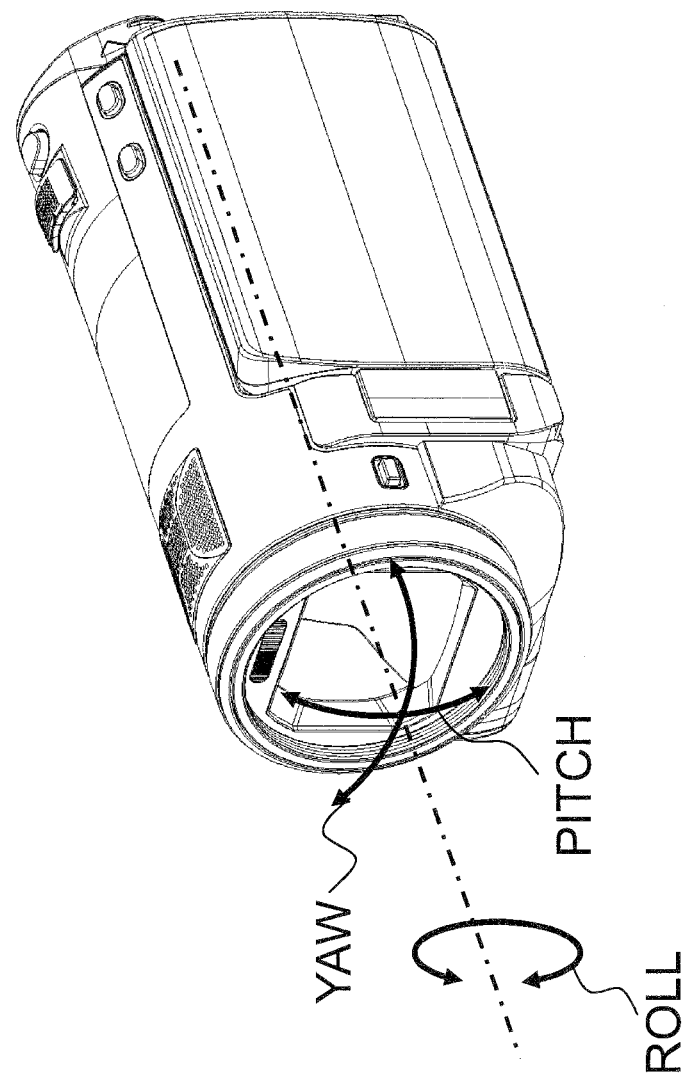
FIG. 1 is a view for describing a type of a shaking direction of a digital video camera by a camera shake.

FIG. 1 is a schematic view for describing a type of a camera shake direction of a digital video camera. A digital video camera 100 can capture a moving image or a still image. The digital video camera 100 has a camera shake correction function. The camera shake correction function is a function that reduces an influence of shakes or swinging (camera shakes) of the digital video camera 100 due to shaking, swinging, or the like of user's hand on the captured moving image or the captured still image. The digital video camera 100 can correct camera shakes in a yaw direction, a pitch direction, and a roll direction shown in FIG. 1. The digital video camera 100 optically corrects a camera shake in a yaw direction and a camera shake in a pitch direction. The digital video camera 100 electronically corrects the camera shake in the roll direction (hereinafter arbitrarily referred to as a "rotating camera shake") with image processing.

In correction in the roll direction, the digital video camera 100 determines a rotating angle depending on an angular velocity (hereinafter arbitrarily referred to as a "detected angular velocity") detected by a gyro sensor (described later), and performs correction to rotate a captured image in the roll direction based on the determined rotating angle. In this manner, the digital video camera 100 can perform more adequate rotating camera shake correction.

1-2. Configuration

Figure 2:
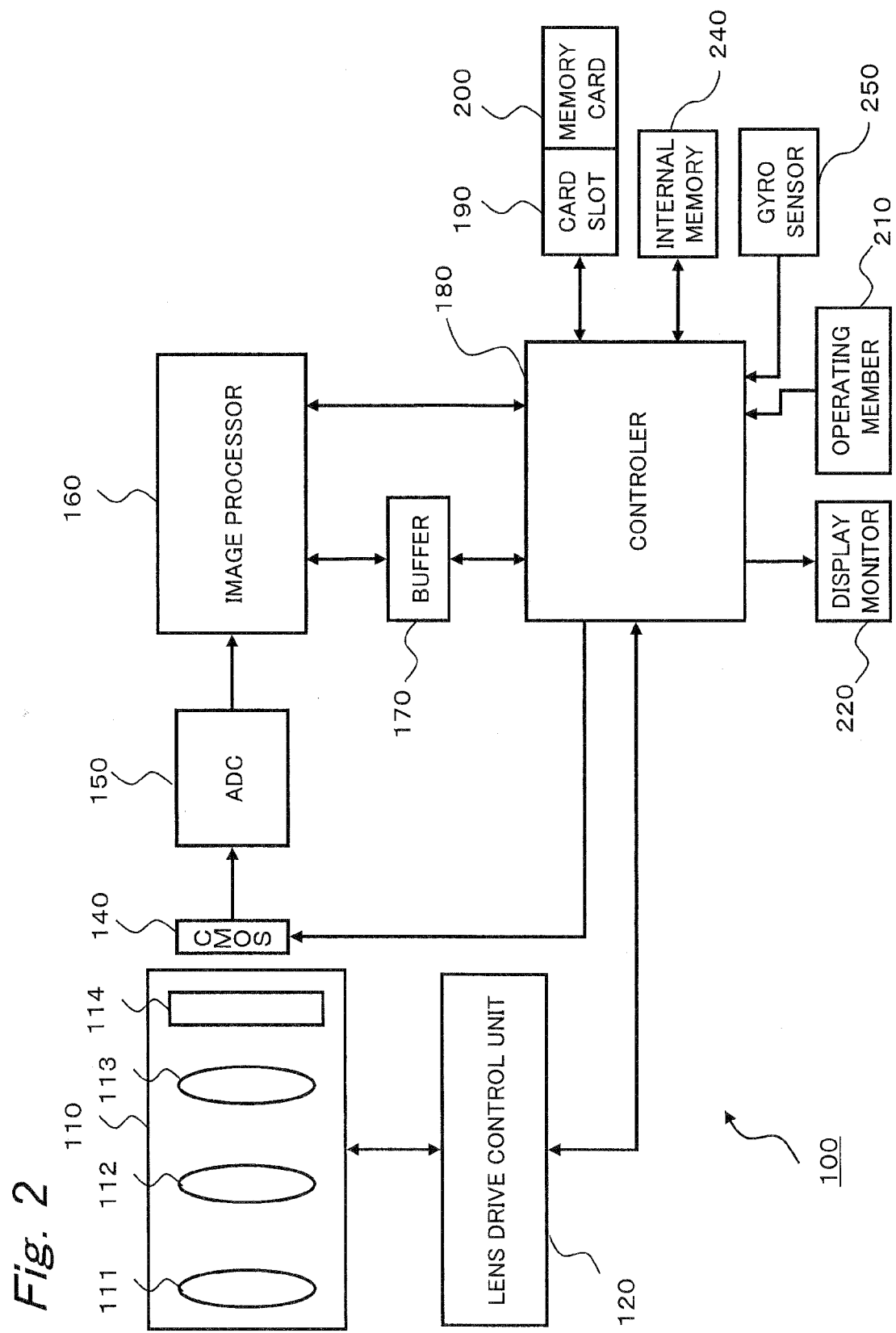
FIG. 2 is a block diagram showing an electric configuration of the digital video camera.

An electric configuration of the digital video camera 100 according to the embodiment will be described with reference to FIG. 2. FIG. 2 is a block diagram showing a configuration of the digital video camera 100.

The digital video camera 100 includes an optical system 110, a lens drive control unit 120, a CMOS image sensor 140, an A/D converter 150, an image processor 160, a buffer 170, a controller 180, a card slot 190, an operating member 210, a display monitor 220, an internal memory 240, and a gyro sensor 250.

The digital video camera 100 captures a subject image formed by the optical system 110 including one lens or a plurality of lenses using the CMOS image sensor 140. Image data generated by the CMOS image sensor 140 is subjected to various processes in the image processor 160, and is stored in a memory card 200. A detailed configuration of the digital video camera 100 will be described below.

The optical system 110 includes a zoom lens 111, a camera shake correction lens 112, a focus lens 113, and a diaphragm 114. The zoom lens 111 moves along the optical axis so that a subject image can be enlarged or reduced. When the focus lens 113 is moved along the optical axis, a focus state of a subject image can be adjusted. The camera shake correction lens 112 can move in a plane vertical to the optical axis of the optical system 110. The camera shake correction lens 112 is moved to a direction in which the camera shake of the digital video camera 100 is cancelled, so that an influence of the camera shake of the digital video camera 100 on the captured image can be reduced. A size of an opening of the diaphragm 114 is adjusted automatically or according to user's setting, so that a quantity of light transmitting through the diaphragm is adjusted.

The optical system 110 includes a zoom actuator for driving the zoom lens 111, a camera shake correction actuator for driving the camera shake correction lens 112, a focus actuator for driving the focus lens 113, and a diaphragm actuator for driving the diaphragm 114.

The lens drive control unit 120 drives the various lenses 111, 112, and 113 and the diaphragm 114 included in the optical system 110. The lens drive control unit 120, for example, controls the zoom actuator, the focus actuator, the camera shake correction actuator, and the diaphragm actuator included in the optical system 110.

The CMOS image sensor 140 captures a subject image formed by the optical system 110 to generate image data. For example, the CMOS image sensor 140 generates image data of 60 frames per second when a moving image capture mode is set as a capture mode. The CMOS image sensor 140 is an image sensor using a manner of reading lines sequentially. The CMOS image sensor 140 performs various operations such as exposure, transfer, and electronic shutter.

The A/D converter (ADC) 150 converts analog image data generated by the CMOS image sensor 140 into digital image data. More specifically, analog image data outputted from each of the pixels of the CMOS image sensor 140 is digitized and outputted.

The image processor 160 gives various processes to the image data generated by the CMOS image sensor 140 and converted by the A/D converter 150, and generates image data for displaying on the display monitor 220 or image data for storing in the memory card 200. For example, the image processor 160 executes various processes such as gamma correction, white balance correction, and damage compensation on the image data generated by the CMOS image sensor 140 and converted by the A/D converter 150. For example, the image processor 160 executes rotating correction on the image data generated by the CMOS image sensor 140 and converted by the A/D converter 150. Further, the image processor 160 compresses the image data generated by the CMOS image sensor 140 and converted by the A/D converter 150 according to a compressing format such as H.264 standards or MPEG2 standards. The image processor 160 can be realized by a DSP or a microcomputer.

The controller 180 is a control unit for controlling the entire digital video camera. The controller 180 can be realized by a semiconductor element or the like. The controller 180 may be realized by only hardware or by a combination of hardware and software. The controller 180 can be realized by a microcomputer or the like. The controller 180 calculates, based on the angular velocity detected by the gyro sensor 250, a correction angle used when the rotating correction is given to the image processor 160.

The buffer 170 functions as a work memory of the image processor 160 and the controller 180. The buffer 170 can be realized by, for example, a DRAM or a ferroelectric memory.

The memory card 200 can be attached to or detached from the card slot 190. The card slot 190 can be mechanically and electrically connected to the memory card 200. The memory card 200 contains a flash memory or a ferroelectric memory, and can store data such as an image file generated by the image processor 160.

The internal memory 240 includes the flash memory or the ferroelectric memory. The internal memory 240 stores a control program or the like for controlling the entire digital video camera 100.

The operating member 210 is a user interface that accepts operations from users. The operating member 210 includes a cross key, a determination button, and the like that accept user's operations, for example.

The display monitor 220 can display an image (through image) represented by image data generated by the CMOS image sensor 140, and an image represented by image data read from the memory card 200. Further, the display monitor 220 can display also various menu screens for various settings of the digital video camera 100.

The gyro sensor 250 is a sensor for detecting an angular velocity of a camera shake of the digital video camera 100. The gyro sensor 250 can detect, as shown in FIG. 1, angular velocities in the yaw direction, the pitch direction, and the roll direction. The gyro sensor 250 outputs the detected angular velocities in association with frames generated by the CMOS image sensor 140. For example, an angular velocity detected by the gyro sensor 250 at a timing at which a center line of a capture region of the CMOS image sensor 140 is read is handled as an angular velocity corresponding to the frame.

1-3. Correction Operation

Figure 3B:
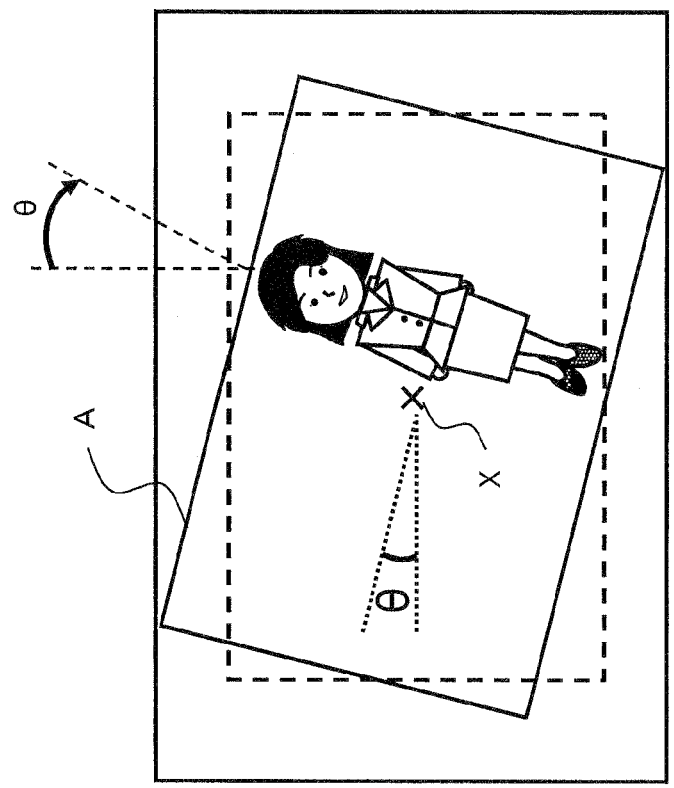
FIGS. 3A and 3B are schematic views for describing rotating camera shake correction.
Figure 3A:
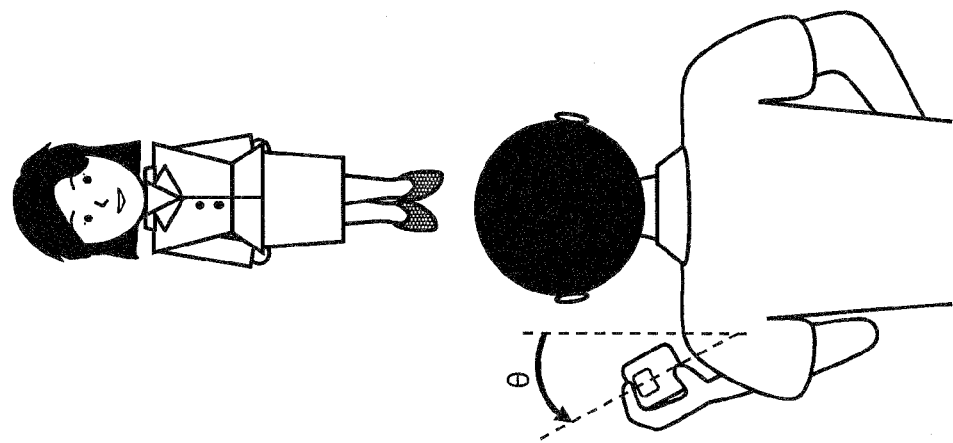

The digital video camera 100 according to the embodiment has a rotating camera shake correction function that reduces a rotating-direction (roll-direction) influence given by a camera shake of the digital video camera 100 on an image formed on the CMOS image sensor 140. A concrete method of rotating camera shake correction will be described below with reference to FIGS. 3A and 3B. FIGS. 3A and 3B are schematic diagrams for describing the rotating camera shake correction. FIG. 3A is a view for describing a relationship between a user and a subject. FIG. 3B is a schematic view showing an image captured in the relationship of FIG. 3A.

As shown in FIG. 3A, it is assumed that a user captures a subject in a state where the digital video camera 100 is counterclockwise swung by θ degrees from an original capturing position (position at which an extending direction of the line of the CMOS image sensor 140 of the digital video camera 100 is matched with the horizontal direction). In this state, as shown in FIG. 3B, an image in which the subject is clockwise rotated about a center X by θ degrees is captured. In this state, image data is cut out such that a position clockwise tilted by θ degrees with reference to the horizontal direction as indicated by a solid line A in FIG. 3B is set as a cutting-out position. As a result, image data where a subject does not tilt in the roll direction is cut out. The method of generating an image in which the rotating camera shake is reduced is rotating camera shake correction. Details of the rotating camera shake correction operation in the digital video camera 100 will be described below. The "rotating camera shake correction" is arbitrarily referred to as "rotating correction" hereinafter.

1-3-1. Rotating Correction Process Based on Detected Angular Velocity

Figure 4:
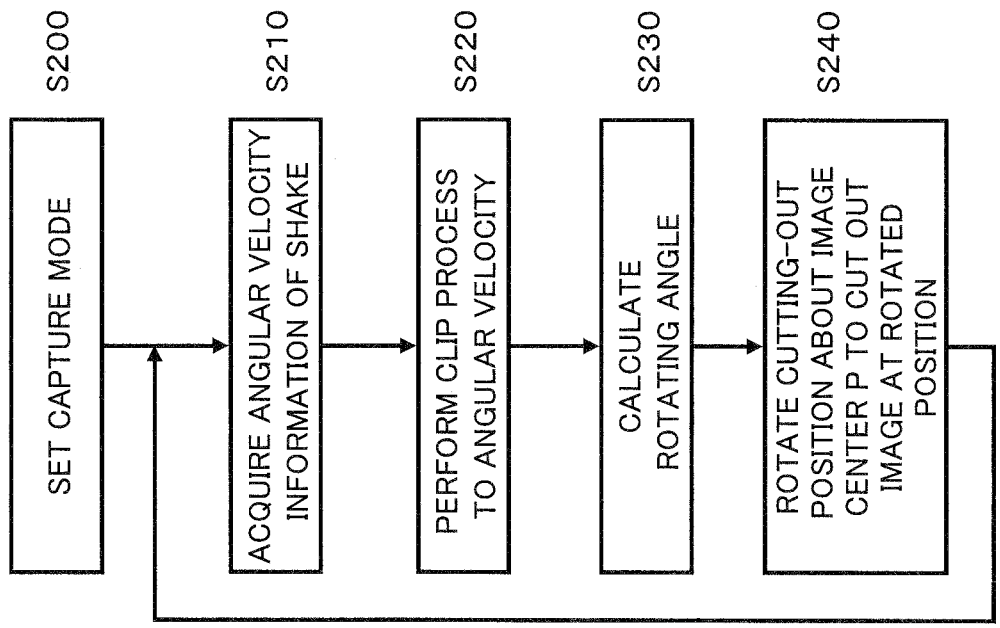
FIG. 4 is a flow chart for describing a rotating correction process based on a detected angular velocity.

A rotating correction process based on a detected angular velocity of the digital video camera 100 according to the embodiment will be described below with reference to FIG. 4. FIG. 4 is a flow chart for describing a rotating correction process based on a detected angular velocity. In this embodiment, the rotating correction process when a moving image capture mode is set as a capture mode will be described.

The user operates a mode selection dial of the operating member 210 to be capable of setting the digital video camera 100 to a moving image capture mode. When the digital video camera 100 is set to the capture mode (8200), a subject is captured by the CMOS image sensor 140 to generate an image signal. The image signal generated by the CMOS image sensor 140 is converted into a digital image signal by the A/D converter 150 and processed by the image processor 160. An image based on the image signal processed by the image processor 160 is displayed as a through image on the display monitor 220.

When the capture mode is set, the controller 180 acquires angular velocity information about the roll direction from the gyro sensor 250 (S210). As described above, the controller 180 handles an angular velocity detected by the gyro sensor 250 as an angular velocity of the frame at a timing at which the center line of the capture region of the CMOS image sensor 140 is read. Since a camera shake state changes, detected angular velocities change depending on frames outputted from the CMOS image sensor 140. The angular velocity about the roll direction is acquired to make it possible to obtain a frequency of rotation in the roll direction that is in proportion to the angular velocity.

Prior to the rotating correction by the image processor 160, the controller 180 gives a clip process (angular velocity determining process) to the angular velocity detected in a frame to be subjected to the rotating correction to determine an angular velocity to be used in the rotating correction (S220). More specifically, when the detected angular velocity is smaller than a predetermined angular velocity, the controller 180 determines the detected angular velocity as the angular velocity used in the rotating correction. On the other hand, when the detected angular velocity is larger than the predetermined angular velocity, the predetermined angular velocity is determined in place of the detected angular velocity as the angular velocity used in the rotating correction. The predetermined angular velocity is set such that an angle of rotation (roll) obtained by integrating the predetermined angular velocity by time (for example, 1/60 second) per frame is a value represented by a θβ line in FIG. 5 (will be described later). The predetermined angular velocity is a value changing depending on frequencies of a camera shake. In the embodiment, clipping (limiting) at the predetermined angular velocity is clipping at a predetermined angle. For this reason, the predetermined angle is arbitrarily referred to as a "predetermined clip angle" hereinafter.

When the controller 180, in step S220, determines an angular velocity to be used in the rotating correction, the controller 180 calculates a rotating (roll) angle by integrating the determined angular velocity (S230). For example, the controller 180 calculates a rotating (roll) angle in the frame by integrating the angular velocity determined in step S220 by time (for example, 1/60 second) per frame. When the angle is calculated, the controller 180, based on the calculated angle, rotates the cutting-out position (cutting-out range) about the image center X to cut out the image at the rotated position (S240). Thereafter, the digital video camera 100 records the cutout image data into the memory card 200. The digital video camera 100 repeats the process in steps S210 to S240 according to an updating frequency of a video signal. Since the digital video camera 100 updates a video signal at 60 frames per second, it executes also the process in steps S210 to S240 at 60 frames per second.

Figure 5:
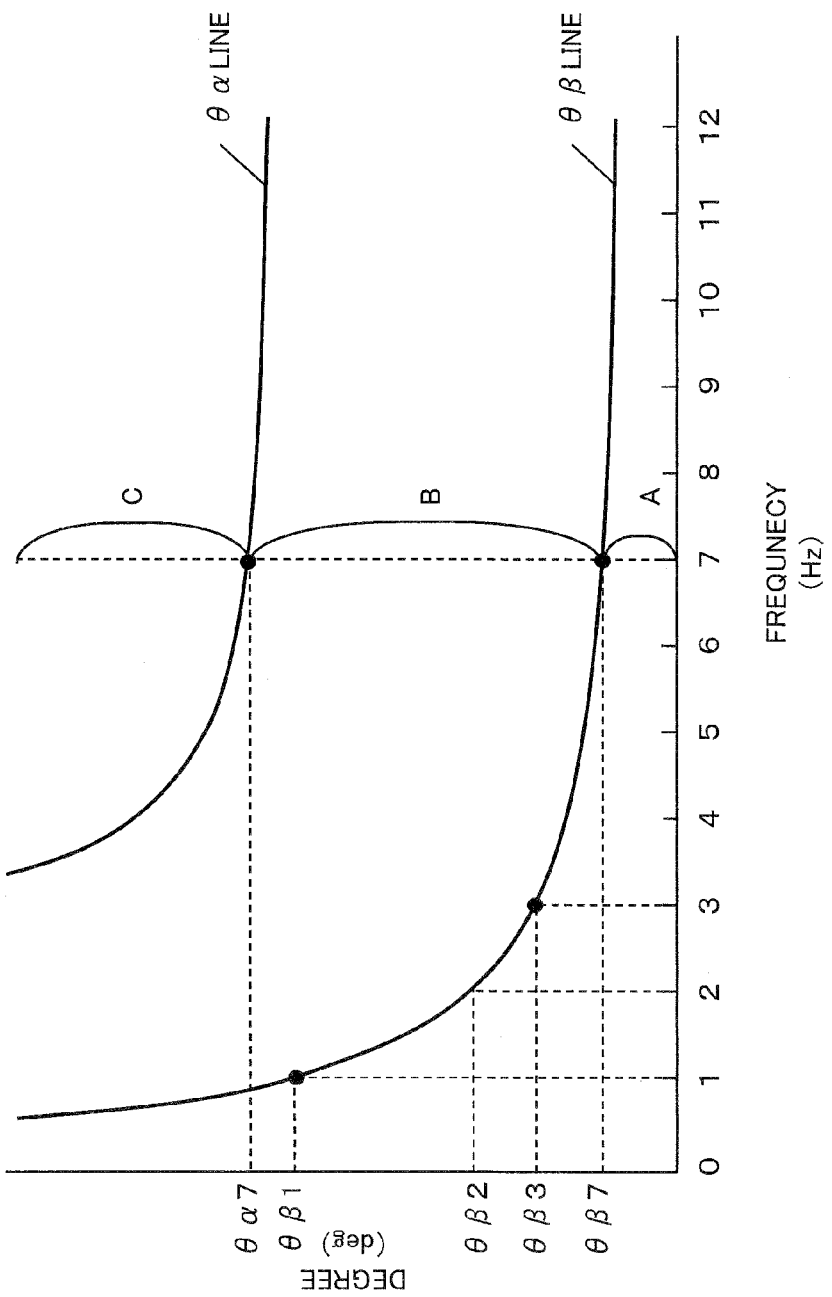
FIG. 5 is a diagram for describing a clip angle in rotating correction.

Details of a clip process of the digital video camera 100 according to the embodiment will now be described with reference to FIG. 5. FIG. 5 is a diagram for describing a clip angle in rotating correction.

An ordinate of the graph shown in FIG. 5 indicates an angle obtained by integrating the angular velocity detected by the gyro sensor 250. On the other hand, an abscissa of the graph shown in FIG. 5 indicates a frequency corresponding to the angular velocity detected by the gyro sensor 250.

A θα line shown in FIG. 5 is a line determined based on the performance of the gyro sensor 250. The θα line denotes a maximum value of an angle that can be normally detected by the gyro sensor 250.

The θβ line shown in FIG. 5 is a line indicating a threshold value of clip. The θβ line is designed such that proper rotating correction is performed when a user captures a subject while walking with the digital video camera 100 in her/his hand. For example, in FIG. 5, it is assumed that, a shake in a region having frequencies of 0 to 3 Hz and angles of 0 to θβ3 (for example, 1.5 degrees) is a primary shake which occurs at a time when a person captures an image while walking with the digital video camera 100 in her/his hand. The θβ line is designed such that a rotating camera shake in the region having frequencies of 0 to 3 Hz and angles of 0 to θβ3 (for example, 1.5 degrees) can be completely canceled by rotating correction.

A region A (region under the θβ line, for example, region having angles of 0 to θβ7 at a frequency of 7 Hz) shown in FIG. 5 is a region in which distortion of a subject in the image is not outstanding even though rotating correction is performed. A region B (region between the θα line and the θβ line, for example, region having angles of θβ7 to θα7 at a frequency of 7 Hz) shown in FIG. 5 is a region that can be subjected to rotating correction and in which distortion of a subject in the image is outstanding when rotating correction is performed. A region C (region above the θα line, for example, region having an angle equal to or more than θα7 at a frequency of 7 Hz) shown in FIG. 5 is a region in which the gyro sensor 250 cannot accurately detect an angular velocity or cannot detect the angular velocity at all.

The controller 180 performs a clip process based on the θβ line. More specifically, when an angle based on the angular velocity detected by the gyro sensor 250 is present in the region B or the region C (region above the θβ line), the controller 180 sets an angle indicated by the θβ line as an angle used in a camera shake correction process in place of the angle based on the angular velocity.

The CMOS image sensor 140, as described above, is an image sensor using a manner of reading lines sequentially. For this reason, read times (read timings) of the lines are different from each other. On the other hand, angular velocities detected by the gyro sensor 250 change depending on times, and change from time to time. Thus, each time the CMOS image sensor 140 outputs a line, a detected angular velocity (i.e., a value representing a rotating camera shake component) changes.

In this case, it is assumed that an angle (hereinafter arbitrarily referred to as an "angle based on an angular velocity") calculated based on the angular velocity detected by the gyro sensor 250 is larger than θα7 at a frequency of 7 Hz. More specifically, it is assumed that the angle based on the angular velocity detected by the gyro sensor 250 is included in the region C. In this case, since the maximum angle that can be normally detected by the gyro sensor 250 is θα7, the controller 180 detects the angle as θα7 even though an angle of an actual rotating camera shake is larger than θα7. In this case, if the image processor 160 performs rotating correction to a captured image at the angle of θα7. In the case, since a rotating camera shake having an angle larger than θα7 is actually present, the rotating correction is not sufficiently performed, and a corrected image becomes a blurred image.

In this case, it is assumed that an angle based on the angular velocity detected by the gyro sensor 250 is larger than θβ7 and smaller than θα7 at a frequency of 7 Hz. More specifically, it is assumed that the angle based on the angular velocity detected by the gyro sensor 250 is included in the region B. At this time, since the angle that can be normally detected by the gyro sensor 250 is equal to or less than θα7, the controller 180 can detect an actual rotating camera shake angle. In this case, it is assumed that the image processor 160 directly performs rotating correction at the detected rotating camera shake angle without performing a clip process in the controller 180. At this time, even though a rotating camera shake actually occurs, the rotating camera shake is canceled by the image processor 160. For this reason, an image that rarely includes a rotating camera shake is displayed on the display monitor 220. However, as described above, in the image sensor using a manner of reading lines sequentially, detected angular velocities change depending on the lines outputted by the CMOS image sensor 140. More specifically, rotating camera shake components change depending on the lines. For this reason, the image displayed on the display monitor 220 is an image in which distortion of a subject is clearly visually recognized by the rotating correction.

Thus, in the digital video camera 100 according to the embodiment, when an angle based on the angular velocity detected by the gyro sensor 250 ranges from the angle of θβ7 to the angle of θα7 at a frequency of 7 Hz, i.e., the angle is included in the region B, the angle is clipped to θβ7 (at a frequency of 7 Hz). In this manner, the image processor 160 performs rotating correction to a captured image at θβ7 even though a rotating camera shake larger than θβ7 actually occurs. With this correction, the rotating camera shake is reduced to some extent. More specifically, a part of a rotating camera shake component larger than θβ7 remains. On the display monitor 220, an image including somewhat a rotating camera shake is displayed due to the remaining rotating camera shake component. In this manner, when a user views the image displayed on the display monitor 220, the user does not easily visually recognize distortion of the subject on the image. More specifically, the distortion of the subject can be obscured by the rotating correction described above.

In this case, it is assumed that an angle based on the angular velocity detected by the gyro sensor 250 ranges from 0 to θβ7 at a frequency of 7 Hz. More specifically, it is assumed that the angle based on the angular velocity detected by the gyro sensor 250 is included in the region A. In this case, since an actual rotating camera shake angle is equal to or less than the clip angle, the image processor 160 performs rotating correction to a captured image based on an actual angle detected by the gyro sensor 250. In the region A, even though a slight rotating camera shake actually occurs, the rotating camera shake is canceled by the image processor 160. For this reason, an image that rarely includes a rotating camera shake is displayed on the display monitor 220. Further, in the region A, since the rotating camera shake angle is small, even though an image in which a rotating camera shake is canceled by the image processor 160 is displayed on the display monitor 220, distortion of the subject is not outstanding.

Figure 6C:
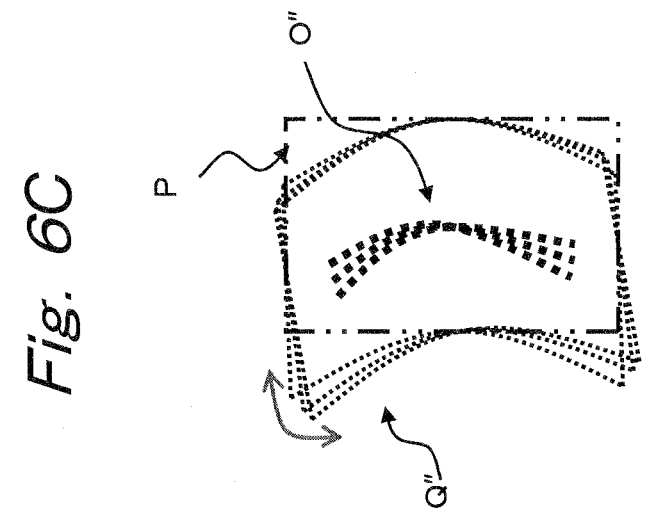
FIGS. 6A to 6C are diagrams for describing an effect of the rotating correction according to the disclosure.
Figure 6B:
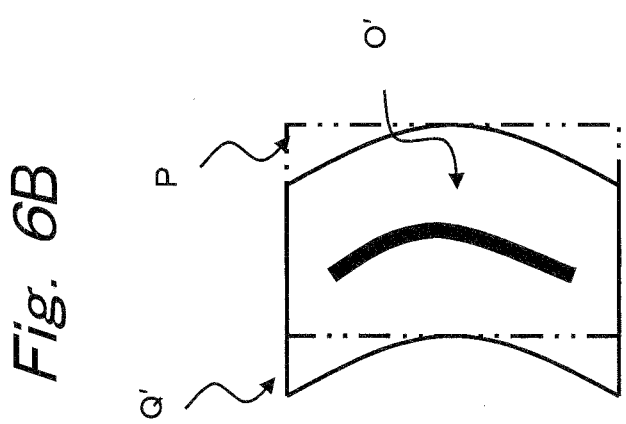
Figure 6A:
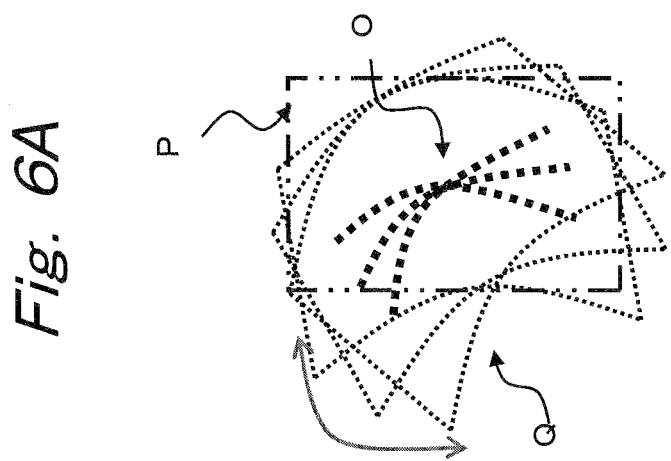

FIGS. 6A to 6C are diagrams for describing an effect of the rotating correction according to the disclosure. More specifically, FIG. 6A is a diagram showing a rotating camera shake on an image when no rotating correction is performed. The image shows a case in which a linear rod-like subject is captured. As shown in FIG. 6A, when a relatively large rotating camera shake occurs, an image P that is originally rectangular, as indicated by an arrow Q, is not only deformed but also suffers a rotating camera shake at a large angle. As a result, the subject that is originally linear, as indicated by an arrow O, is not only largely deformed but also suffers a rotating camera shake at a large angle. However, since a rotating camera shake is large on the entire image, recognition itself of the image contents is difficult.

FIG. 6B is a diagram showing an image obtained when rotating correction that rotates an image based on a detected rotating angular velocity is performed. As shown in FIG. 6B, when rotating correction that rotates an image at an angle based on a detected angular velocity is performed, a rotating camera shake on the entire image is considerably suppressed. For this reason, a user can clearly recognize that the image itself is largely deformed as indicated by an arrow Q' and that the subject included in the image P is largely deformed as indicated by an arrow O'. For this reason, the user may have an uncomfortable feeling.

FIG. 6C is a diagram showing a state of an image when the rotating correction of the disclosure is performed. As shown in FIG. 6B, rotating correction that rotates an image at an angle based on a clipped angular velocity is performed. More specifically, rotating correction is performed at an angle smaller than the angle based on the angular velocity detected by the gyro sensor 250 such that a rotating camera shake remains somewhat even after the rotating correction. In this manner, as indicated by an arrow Q", an angle of a rotating camera shake of an image decreases, and the image contents can be easily recognized. At this time, since the rotating camera shake of the image remains, a subject included in the image suffers somewhat a rotating camera shake as indicated by an arrow O". For this reason, it cannot be easily recognized that the subject is largely deformed. In this manner, an uncomfortable feeling held by the user is reduced.

1-4. Effect or the Like

As described above, in the embodiment, the digital video camera 100 includes:

the CMOS image sensor 140 that exposes a subject image by reading lines sequentially to generate an image;

the gyro sensor 250 (detector) that detects an angular velocity of a shake of the digital video camera 100;

the controller 180 that:
(i) determines the detected angular velocity as an angular velocity for correction when the detected angular velocity is equal to or less than a predetermined angular velocity and, determines the predetermined angular velocity as the angular velocity for correction when the detected angular velocity is larger than the predetermined angular velocity; and
(ii) corrects to reduce an influence by a shake to the image generated by the CMOS image sensor 140 by image processing based on the determined angular velocity for correction.

In this manner, when the detected angular velocity is larger than the predetermined angular velocity, based on the predetermined angular velocity, correction to reduce the influence by the shake is performed to the image generated by the CMOS image sensor 140. A camera shake remains somewhat on the corrected image. For this reason, distortion of the subject in the captured image is not easily visually recognized by a user. For this reason, a user who views an image for which a camera shake is corrected can be suppressed from having an uncomfortable feeling.

In the embodiment, the gyro sensor 250 detects an angular velocity of a shake in a roll direction about an optical axis of the digital video camera 100 as a shake of the digital video camera 100,
the controller 180:
(i) determines the detected angular velocity of the shake in the roll direction as an angular velocity for correction when the detected angular velocity of the shake in the roll direction is equal to or less than a predetermined angular velocity and determines the predetermined angular velocity as the angular velocity for correction when the detected angular velocity of the shake in the roll direction is larger than the predetermined angular velocity, and
(ii) performs rotating correction to rotate the image about an optical axis to the image generated by the CMOS image sensor 140 based on the determined angular velocity for correction.

In this manner, the above effect can be obtained in correction to the shake in the roll direction.

In the embodiment, the controller 180:
(i) determines a rotating angle at which rotating correction is performed based on the determined angular velocity for correction, and
(ii) performs rotating correction to rotate an image about an optical axis based on the determined rotating angle.

For this reason, based on the rotating angle determined by the controller 180, the rotating correction to rotate the image about the optical axis can be performed.

In the embodiment, the detecting unit is the gyro sensor 250.

In this manner, an angular velocity of a shake can be accurately detected.

In the embodiment, an image generated by the CCD 140 is a moving image.

For this reason, when the image generated by the CCD 140 is a moving image, an effect by the camera shake correction is obtained. More specifically, according to the correction, when the detected angular velocity is larger than the predetermined angular velocity, a shake of a subject remains somewhat. For this reason, distortion of the subject in the captured image is further difficult to be visually recognized by a user. Thus, a user who views an image for which a shake is corrected can be further suppressed from having an uncomfortable feeling. More specifically, according to the embodiment, an especially great effect is obtained when the image generated by the CCD 140 is a moving image.

2. Other Embodiments

As described above, as an exemplification of a technique disclosed in this application, the first embodiment has been described. However, the technique in the disclosure can be applied to not only the embodiment but also embodiments in which a change, replacement, addition, omission and the like are arbitrarily performed. The constituent elements described in the first embodiment are combined to each other to make it possible to obtain a new embodiment.

Other embodiments will be illustrated.

In the embodiment, the CMOS image sensor 140 is illustrated as an imaging unit, but the imaging unit is not limited to this. For example, the imaging unit may include an image sensor such as an NMOS image sensor using a manner of reading lines sequentially.

The image processor 160 and the controller 180 may be configured by one semiconductor chip, or may be configured by individual semiconductor chips.

Further, the digital video camera 100 executes the process in steps S210 to S240 at 60 frames per second. However, the digital video camera 100 does not have to always have such a configuration. For example, the configuration may be a configuration such that the process in steps S220 and S240 is executed with a frequency equivalent to the updating frequency of the video signal, and the process in steps S210 and step S230 is executed with the detecting frequency of the gyro sensor 250 (for example, 4 kHZ).

The digital video camera 100 detects an angular velocity of a shake in a roll direction and performs rotating correction to suppress an influence by the shake in the roll direction. In a yaw direction and a camera shake in a pitch direction, optical correction about a camera shake is performed. However, the correction is not limited to the above optical correction. For example, the digital video camera 100 may detect an angular velocity of a shake in a yaw direction and perform rotating correction to suppress an influence by the shake in the yaw direction.

More specifically, the following configuration is employed.

The gyro sensor 250 detects an angular velocity of a shake in a yaw direction as a shake of the digital video camera 100,
the controller 180:
(i) determines the detected angular velocity of the shake in the yaw direction as an angular velocity for correction when the detected angular velocity of the shake in the yaw direction is equal to or less than a predetermined angular velocity and determines the predetermined angular velocity as the angular velocity for correction when the detected angular velocity of the shake in the yaw direction is larger than the predetermined angular velocity, and
(ii) the image processor 160 performs moving correction to move the image in the yaw direction to the image generated by the CMOS image sensor 140 based on the determined angular velocity for correction.

In this manner, in the correction to the shake in the yaw direction, the same effect as the effect in correction to the shake in the roll direction can be obtained. In this case, an optical camera shake correction mechanism for the shake in the yaw direction can be made unnecessary.

In the embodiment, the following configuration may also be employed. More specifically, the controller 180:

(i) determines a moving distance in moving correction based on the determined angular velocity for correction, and
(ii) performs moving correction to move an image in the yaw direction based on the determined moving distance.

In this manner, based on the determined moving distance, the moving correction to move the image in the yaw direction can be performed.

For example, the digital video camera 100 may detect an angular velocity of a shake in a pitch direction and perform rotating correction so as to suppress an influence by the shake in the pitch direction.

More specifically, the following configuration is employed.

The gyro sensor 250 detects an angular velocity of a shake in a pitch direction as a shake of the digital video camera 100, the controller 180:
(i) determines the detected angular velocity of the shake in the pitch direction as an angular velocity for correction when the detected angular velocity of the shake in the pitch direction is equal to or less than a predetermined angular velocity and determines the predetermined angular velocity as the angular velocity for correction when the detected angular velocity of the shake in the pitch direction is larger than the predetermined angular velocity, and
(ii) performs moving correction to move the image in the pitch direction to the image generated by the CMOS image sensor 140 based on the determined angular velocity for correction.

In this manner, in the correction to the shake in the pitch direction, the same effect as the effect in correction to the shake in the roll direction can be obtained. In this case, an optical camera shake correction mechanism for the shake in the pitch direction can be made unnecessary.

In the embodiment, the controller 180:
(i) determines a moving distance when moving correction is performed based on the determined angular velocity for correction, and
(ii) performs the moving correction to move the image in the pitch direction based on the determined moving distance.

In this manner, based on the determined moving distance, the moving correction to move the image in the yaw direction can be performed.

The digital video camera 100 may detect information to the angular velocity in at least one direction of the angular velocity of the camera shake in the roll direction, the angular velocity of the camera shake in the yaw direction, and the angular velocity of the camera shake in the pitch direction and perform correction to suppress an influence by the camera shake in the corresponding direction.

As described above, when the camera shakes in the roll direction and the pitch direction are corrected, the characteristics in FIG. 4 are characteristics obtained when the θα line and the θβ line move in an angular axis direction.

In the first embodiment, the digital video camera 100 causes the gyro sensor 250 to detect an angular velocity of a camera shake. However, the detecting method is not limited thereto. For example, the camera shake may be detected by using motion vector information or the like the roll direction that can be calculated based on the captured image. In short, an influence in the roll direction that is given by a camera shake of the digital video camera 100 to an image formed on the CMOS image sensor 140 needs only to be detected.

More specifically, a detector for an angular velocity of a shake includes a motion vector detector that detects a motion vector of an image generated by the CMOS image sensor 140, and detects an angular velocity of a shake of the digital video camera 100 based on the motion vector detected by the motion vector detecting unit.

In this manner, correction for a shake can be performed without arranging a gyro sensor or the like. More specifically, the configuration of the digital video camera 100 can be simplified. According to the configuration, all shakes in a roll direction, a yaw direction, and a pitch direction can be detected.

In each of the embodiments, the image processor 160 (correcting unit) performs correction to reduce an influence by a shake to the image generated by the CMOS image sensor 140 by image processing based on the determined angular velocity for correction. However, the correction is not limited thereto. For example, based on the determined angular velocity for correction, the camera shake correction lens 112 may be driven to reduce the influence by the camera shake. Also in this case, the same effect as those in the embodiments can be obtained.

As described above, as an exemplification of a technique in the disclosure, embodiments have been described. For this purpose, the accompanying drawings and the detailed description have been provided.

Thus, the constituent elements described in the accompanying drawings and the detailed description can include not only constituent elements that are required for solving the problems but also, in order to illustrate the above technique, constituent elements that are not required for solving the problem. For this reason, although the nonessential constituent elements are described in the accompanying drawings and the detailed description, it should not be authorized that the nonessential constituents are required.

In addition, since the embodiment illustrates the technique in the disclosure, various changes, replacements, additions, omissions and the like can be made in the scope of claims or a scope equivalent thereto.

INDUSTRIAL APPLICABILITY

The disclosure can be applied to digital video cameras, digital still cameras, mobile phones with camera functions, smartphones with camera functions, and the like.

What is claimed is:

1. An imaging apparatus comprising:
an image sensor that exposes a subject image by reading lines sequentially to generate an image;
a detector that detects an angular velocity of a shake of the imaging apparatus; and
a controller that performs a clipping process to limit an angular velocity for correction to be no greater than a predetermined angular velocity by:
(i) determining the detected angular velocity as the angular velocity for correction when the detected angular velocity is equal to or less than the predetermined angular velocity and, determining the predetermined angular velocity as the angular velocity for correction when the detected angular velocity is larger than the predetermined angular velocity; and
(ii) correcting to reduce an influence of a shake to the image generated by the image sensor by image processing based on an angle calculated by integrating the determined angular velocity for correction by time;
wherein the predetermined angular velocity is a positive value that changes depending on frequencies of the imaging apparatus shake.

2. The imaging apparatus according to claim 1, wherein
the detector detects an angular velocity of a shake in a roll direction about an optical axis of the imaging apparatus as an angular velocity of a shake of the imaging apparatus,
the controller:
  (i) determines the detected angular velocity of the shake in the roll direction as an angular velocity for correction when the detected angular velocity of the shake in the roll direction is equal to or less than a predetermined angular velocity and determines the predetermined angular velocity as the angular velocity for correction when the detected angular velocity of the shake in the roll direction is larger than the predetermined angular velocity, and
  (ii) performs rotating correction to rotate the image about the optical axis to the image generated by the image sensor based on an angle calculated by integrating the determined angular velocity for correction by time.

3. The imaging apparatus according to claim 2, wherein the controller:
  (i) determines a rotating angle used when the rotating correction is performed based on the determined angular velocity for correction, and
  (ii) performs rotating correction to rotate the image about the optical axis based on the determined rotating angle.

4. The imaging apparatus according to claim 1, wherein
the detector detects an angular velocity of a shake in a yaw direction as an angular velocity of a shake of the imaging apparatus,
the controller:
  (i) determines the detected angular velocity of the shake in the yaw direction as an angular velocity for correction when the detected angular velocity of the shake in the yaw direction is equal to or less than a predetermined angular velocity and determines the predetermined angular velocity as the angular velocity for correction when the detected angular velocity of the shake in the yaw direction is larger than the predetermined angular velocity, and
  (ii) performs moving correction to move the image in the yaw direction to the image generated by the imaging unit based on an angle calculated by integrating the determined angular velocity for correction by time.

5. The imaging apparatus according to claim 4, wherein the controller:
  (i) determines a moving distance used when the moving correction is performed based on the determined angular velocity for correction, and
  (ii) performs moving correction to move the image in the yaw direction based on the determined moving distance.

6. The imaging apparatus according to claim 1, wherein
the detector detects an angular velocity of a shake in a pitch direction as an angular velocity of a shake of the imaging apparatus,
the controller:
  (i) determines the detected angular velocity of the shake in the pitch direction as an angular velocity for correction when the detected angular velocity of the shake in the pitch direction is equal to or less than a predetermined angular velocity and determines the predetermined angular velocity as the angular velocity for correction when the detected angular velocity of the shake in the pitch direction is larger than the predetermined angular velocity, and
  (ii) performs moving correction to move the image in the pitch direction to the image generated by the image sensor based on an angle calculated by integrating the determined angular velocity for correction by time.

7. The imaging apparatus according to claim 6, wherein the controller:
  (i) determines a moving distance used when the moving correction is performed based on the determined angular velocity for correction, and
  (ii) performs moving correction to move the image in the pitch direction based on the determined moving distance.

8. The imaging apparatus according to claim 1, wherein the detector is a gyro sensor.

9. The imaging apparatus according to claim 1, wherein the detector includes a motion vector detector that detects a motion vector of the image generated by the image sensor, and detects an angular velocity of a shake of the imaging apparatus based on the motion vector detected by the motion vector detector.

10. The imaging apparatus according to claim 1, wherein the image generated by the image sensor is a moving image.

* * * * *